United States Patent
Wang et al.

(10) Patent No.: US 7,466,104 B2
(45) Date of Patent: Dec. 16, 2008

(54) SYSTEM AND METHOD FOR BALANCING CELLS IN A BATTERY PACK WITH SELECTIVE BYPASS PATHS

(75) Inventors: Wei Wang, Shanghai (CN); Guoxing Li, Sunnyvale, CA (US); Sean Xiao, Shanghai (CN)

(73) Assignee: O2 Micro International Limited, Grand Cayman (KY)

( * ) Notice: Subject to any disclaimer, the term of this patent is extended or adjusted under 35 U.S.C. 154(b) by 75 days.

(21) Appl. No.: 11/580,507

(22) Filed: Oct. 13, 2006

(65) Prior Publication Data

US 2008/0088277 A1    Apr. 17, 2008

(51) Int. Cl.
*H01M 10/46* (2006.01)
(52) U.S. Cl. .................................... 320/118
(58) Field of Classification Search ............... 320/116, 320/118, 119
See application file for complete search history.

(56) References Cited

U.S. PATENT DOCUMENTS

| 5,998,967 | A | 12/1999 | Umeki et al. | 320/122 |
| 6,873,134 | B2 | 3/2005 | Canter et al. | 320/118 |
| 2007/0190369 | A1* | 8/2007 | Leach et al. | 429/9 |

* cited by examiner

*Primary Examiner*—Edward Tso

(57) ABSTRACT

A system and method for cell balancing with smart low-voltage control circuit. The cell balancing system comprises a plurality of battery cells, an external bypass path for each cell, an internal bypass path for each cell, an input terminal receiving an enable signal for each cell, an input terminal receiving a selection signal, and a cell balancing unit for generating a configuration signal to conduct the external bypass path or internal bypass path. The enable signal is configured to enable a bypass current of each cell, and the selection signal is configured to select the external bypass path or internal bypass path. The cell balancing unit is employed to receive signals from input terminals, and generate a configuration signal to control the conductance of external bypass paths or internal bypass paths.

26 Claims, 9 Drawing Sheets

SYSTEM AND METHOD FOR BALANCING CELLS IN A BATTERY PACK WITH SELECTIVE BYPASS PATHS

TECHINCAL FIELD

This invention relates to a circuit for cell balancing, and more specifically, to a system or a method for balancing multiple cells or batteries in series during charging.

BACKGROUND ART

Referring to Prior Art FIG. 1, a typical system for balancing cells in the battery 12, in accordance with the prior art is illustrated. This system includes a relay 14 connected to a resistor 23 for each cell 21, and a voltage monitoring circuit 25 for the battery 12. The voltage monitoring circuit 25 monitors the cell voltage across each cell 21. Relay 14 will be switched on to discharge the corresponding cell 21, if the cell 21 has a higher cell voltage than any other cell of the battery 12. Relay 14 will be switched off once the cell 21 is adequately balanced. However, the relay dissipates much power and its switching on-off speed is slow. In addition, since relay 14 is comparatively large, it holds more PCB space.

An alternative is to use power switches rather than relays to balance cells. However, this solution in the prior art needs more complex high-voltage control circuits. As a result, larger die size is required, which does not work well for multiple cells. In addition, this solution in the prior art has a fixed control scheme, which is not capable of flexible cell balance control.

With reference to Prior Art FIG. 2, another system for balancing cell voltages of a Lithium-Ion battery pack 10 is shown. For each battery cell 10-1, 10-2 and 10-3, a cell balance circuit includes a resistor 20, a transistor 22, and a control circuit 24. The resistor 20 and the transistor 22 are connected in series with their end terminals connected to two terminals of the battery cell 10-1, 10-2, or 10-3 respectively. Each control circuit 24 controls the conducting state of the transistor 22, such that two terminals of the battery cell 10-1, 10-2, or 10-3 are short-circuited through the transistor 22 as controlled by the control circuit 24.

Prior Art FIG. 3 shows the detailed circuit configuration of the control circuit 24. The control circuit 24 includes an oscillation circuit 30, a comparator 26, two input terminals 28 and 32 connected to the positive and negative terminals of the corresponding battery cell 10-1, 10-2, or 10-3 respectively, and an output terminal 34 connected to the gate of the corresponding transistor 22.

The oscillator 30 generates a saw-tooth wave voltage which oscillates within a predetermined voltage range. The oscillator 30 will output a voltage equal to the summation of the saw-tooth wave voltage and the voltage at terminal 32 (negative terminal of the cell 10-1, 10-2, or 10-3). Comparator 26 will compare the voltage at the terminal 28 (positive terminal of the cell 10-1, 10-2, or 10-3) with the output voltage from the oscillator 30, and output a comparative signal indicating whether the voltage across the battery cell 10-1, 10-2, or 10-3 exceeds the predetermined voltage range of the oscillator 30. When the voltage over the battery cell 10-1, 10-2, or 10-3 exceeds the predetermined voltage range in the oscillator 30, the control output from the comparator 26, which is a PWM (pulse-width-modulated) signal, will switch on the corresponding transistor 22 to allow the bypass current.

However, the balancing scheme of Prior Art FIG. 3 is fixed by the predetermined voltage range which is set in the oscillator. As result, this conventional method lacks the flexibility to adjust the predetermined voltage range for different kinds of batteries. Furthermore, expensive high-accuracy comparators are required for good cell balancing in Prior Art FIG. 3.

SUMMARY OF THE INVENTION

The present invention provides a system and an approach for balancing battery cells during charging. In accordance with one embodiment of the present invention, a cell balancing system comprises a plurality of battery cells, an external bypass path for each cell, an internal bypass path for each cell, an input terminal receiving an enable signal for each cell, an input terminal receiving a selection signal, and a cell balancing unit for generating a configuration signal to conduct the external bypass path or internal bypass path for each cell. The enable signal is configured to enable a bypass current of the cell, and the selection signal is configured to select the external bypass path or internal bypass path. The cell balancing unit is employed to receive signals from input terminals, and generate a configuration signal to control the conductance of external bypass paths or internal bypass paths.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Prior Art

Prior Art

Prior Art

DESCRIPTION OF EMBODIMENTS

Reference will now be made in detail to the embodiments of the present invention, system and method for cell balancing with smart low-voltage control circuit. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
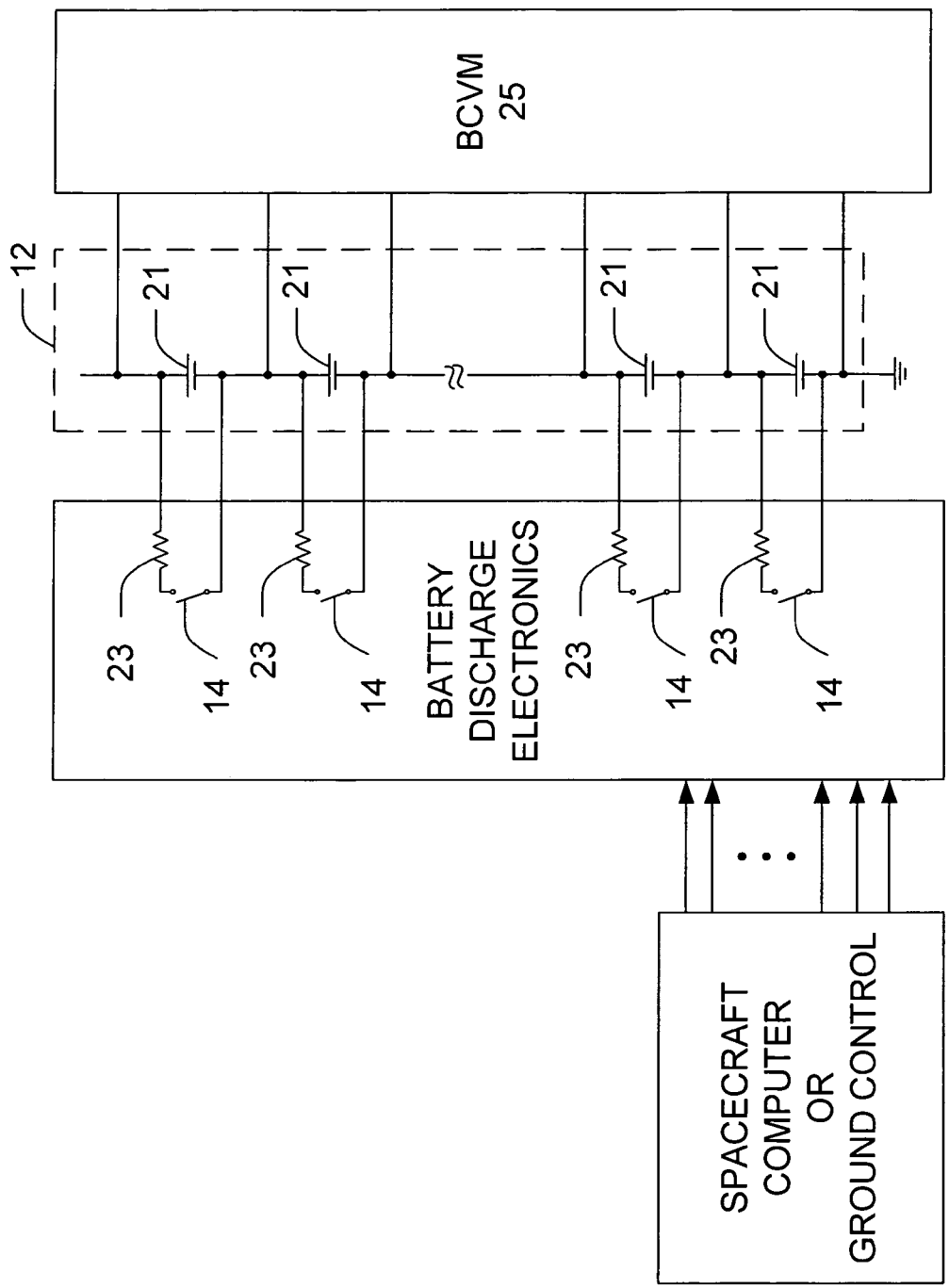
FIG. 1 is a block diagram of a system for balancing the battery, in accordance with the prior art.
Figure 2:
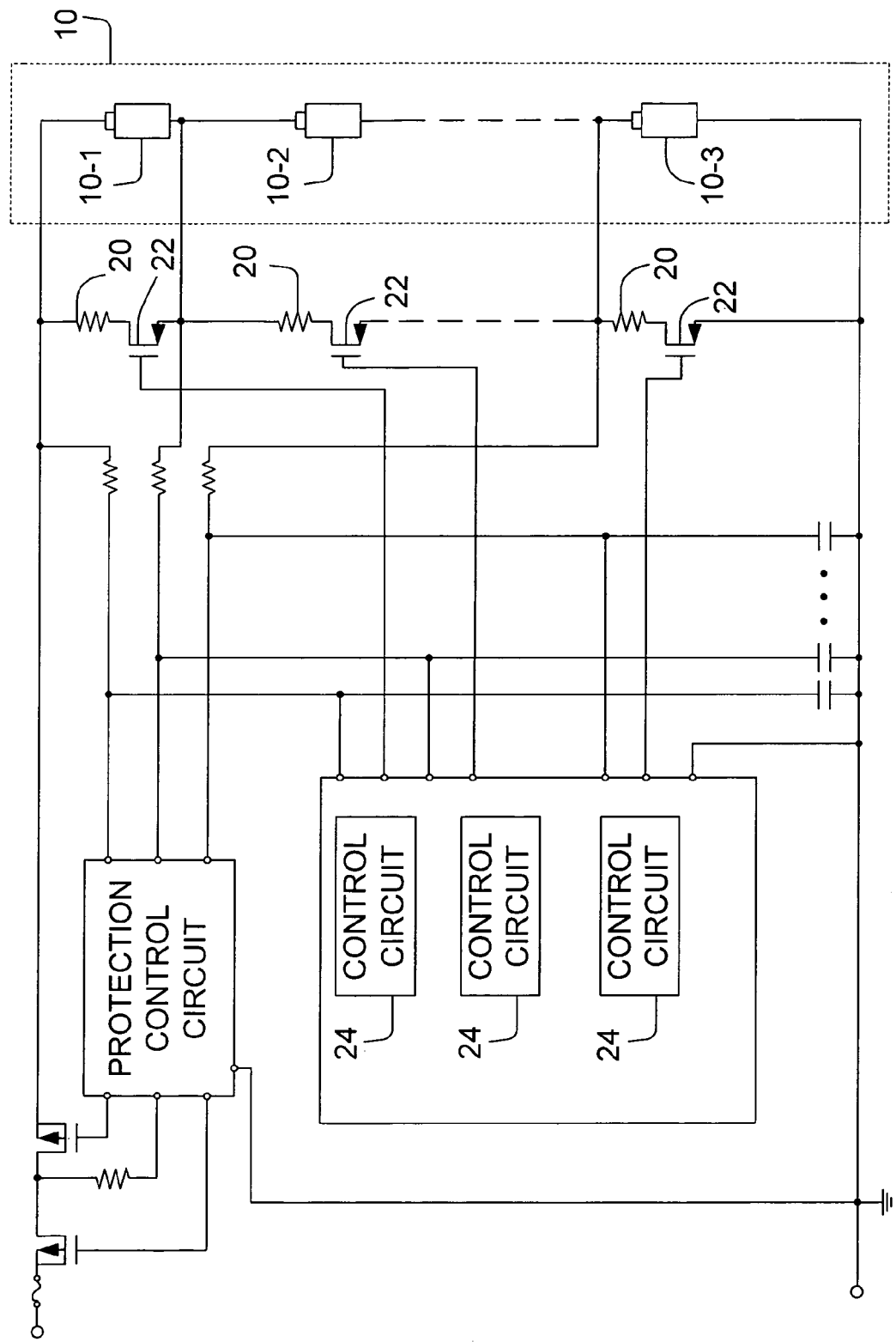
FIG. 2 is another block diagram of a system for balancing the Li-Ion battery, in accordance with the prior art.
Figure 3:
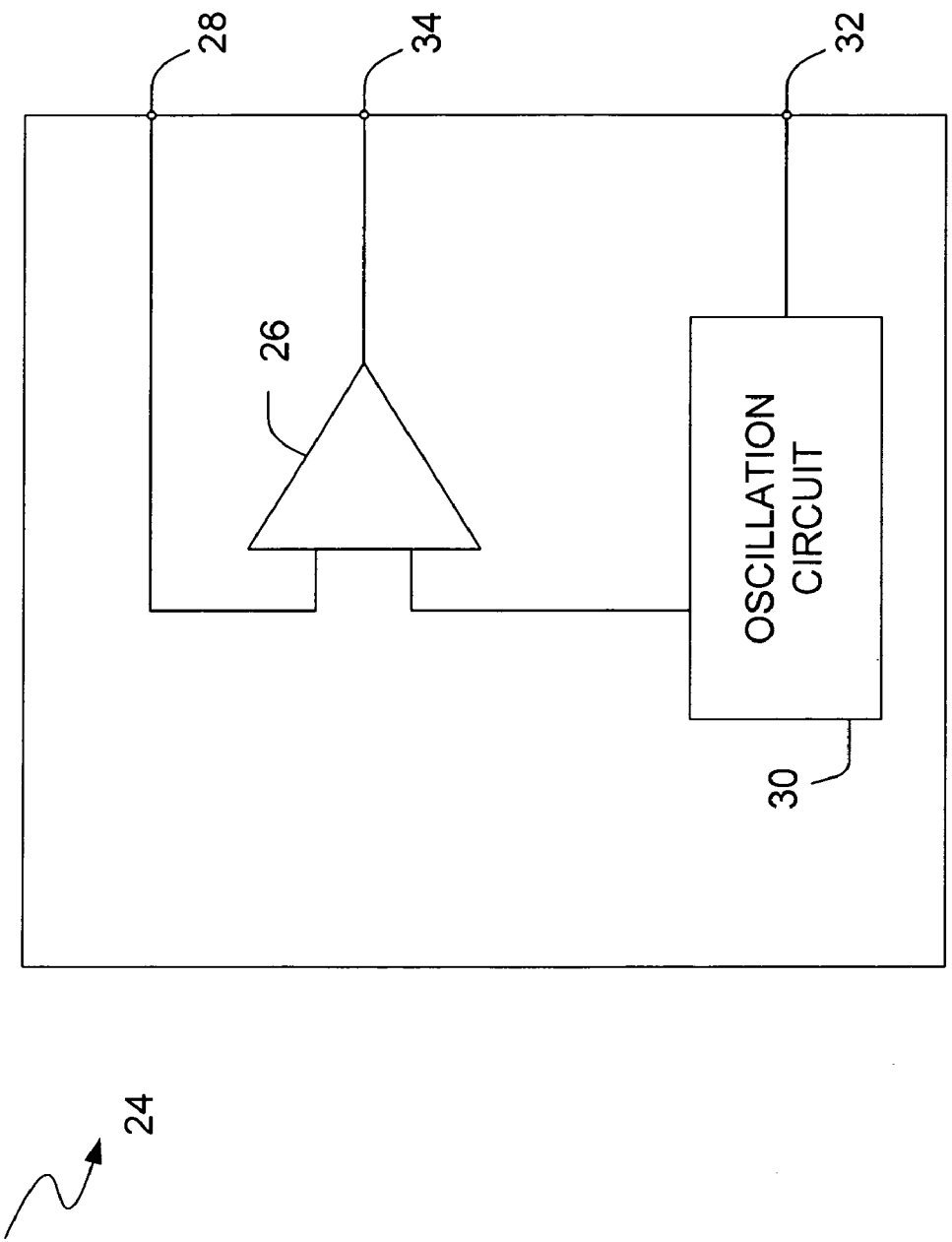
FIG. 3 is a detailed circuit configuration of the control circuit in FIG. 2, in accordance with the prior art.
Figure 4:
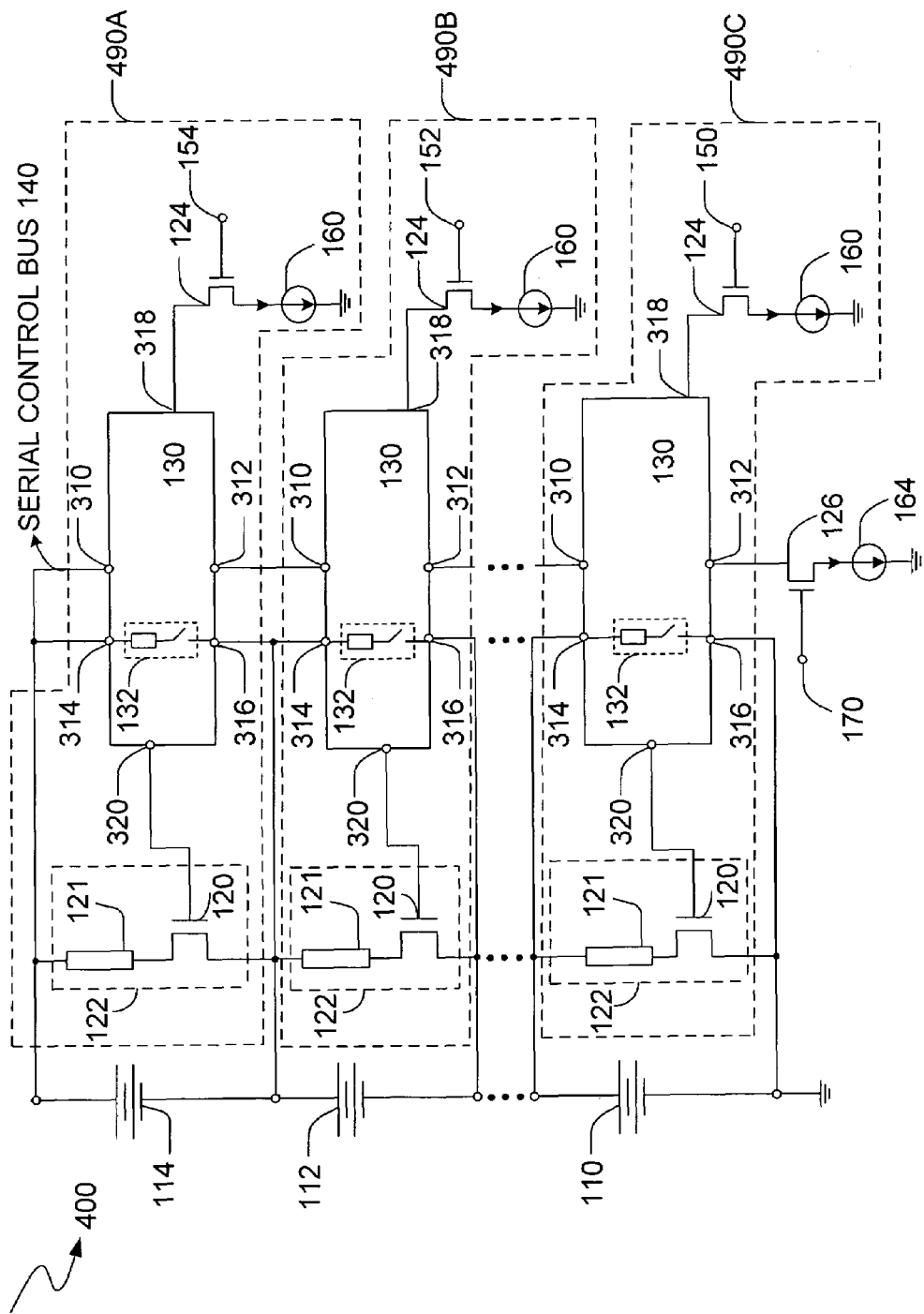
FIG. 4 is a block diagram of a system for balancing Lithium-Ion battery cells by low-voltage cell balancing units, in accordance with one embodiment of the present invention.

Referring to FIG. 4, a block diagram of a system 400 for balancing Lithium-Ion battery cells 110, 112 and 114 by low-voltage cell balancing units 130, in accordance with one embodiment of the present invention is illustrated. The system 400 comprises circuits 490A, 490B and 490C for balancing the battery cells 110, 112 and 114, respectively. Those skilled in the art will recognize that any number of battery cells may be included in system 400.

In general, when a battery cell 110, 112 or 114 meets certain unbalanced conditions (e.g., the voltage across the battery cell exceeds a predetermined threshold), the corresponding circuit 490A, 490B or 490C will control the corresponding battery cell 110, 112 or 114 to perform cell balancing by conducting the bypass current. Since circuits 490A, 490B and 490C for cells 110, 112 and 114 are similar, detailed description will only be made to the circuit 490C for cell 110 for clarity.

The circuit 490C comprises an external bypass path 122, an internal bypass path 132, a driving circuit shown as the cell balancing unit 130, input terminal 150, and input terminal 312.

The external bypass path 122 in circuit 490C includes a resistor 121 and a transistor 120 in series. In addition, the external bypass path 122 is coupled between the positive terminal 314 and negative terminal 316 of the battery cell 110.

The internal bypass path 132 in circuit 490C is also coupled between the positive terminal 314 and negative terminal 316 of the battery cell 110. Furthermore, the internal bypass path 132 is inside the driving circuit which is the cell balancing unit 130.

In accordance with one embodiment of the present invention, the input terminal 150 in circuit 490C receives an enable signal representing whether to enable the bypass current for the battery cell 110.

In accordance with one embodiment of the present invention, the terminal 312 in circuit 490C receives a local selection signal that selects either the external bypass path 122 or the internal bypass path 132 for the battery cell 110. The local selection signal at terminal 312 is controlled by the global selection signal received at the input terminal 170.

In circuit 490C, the cell balancing unit 130 is employed to receive signals from input terminals 150 and 312, and generate a configuration signal to control the conductance of the external bypass path 122 or the internal bypass path 132.

Figure 9:
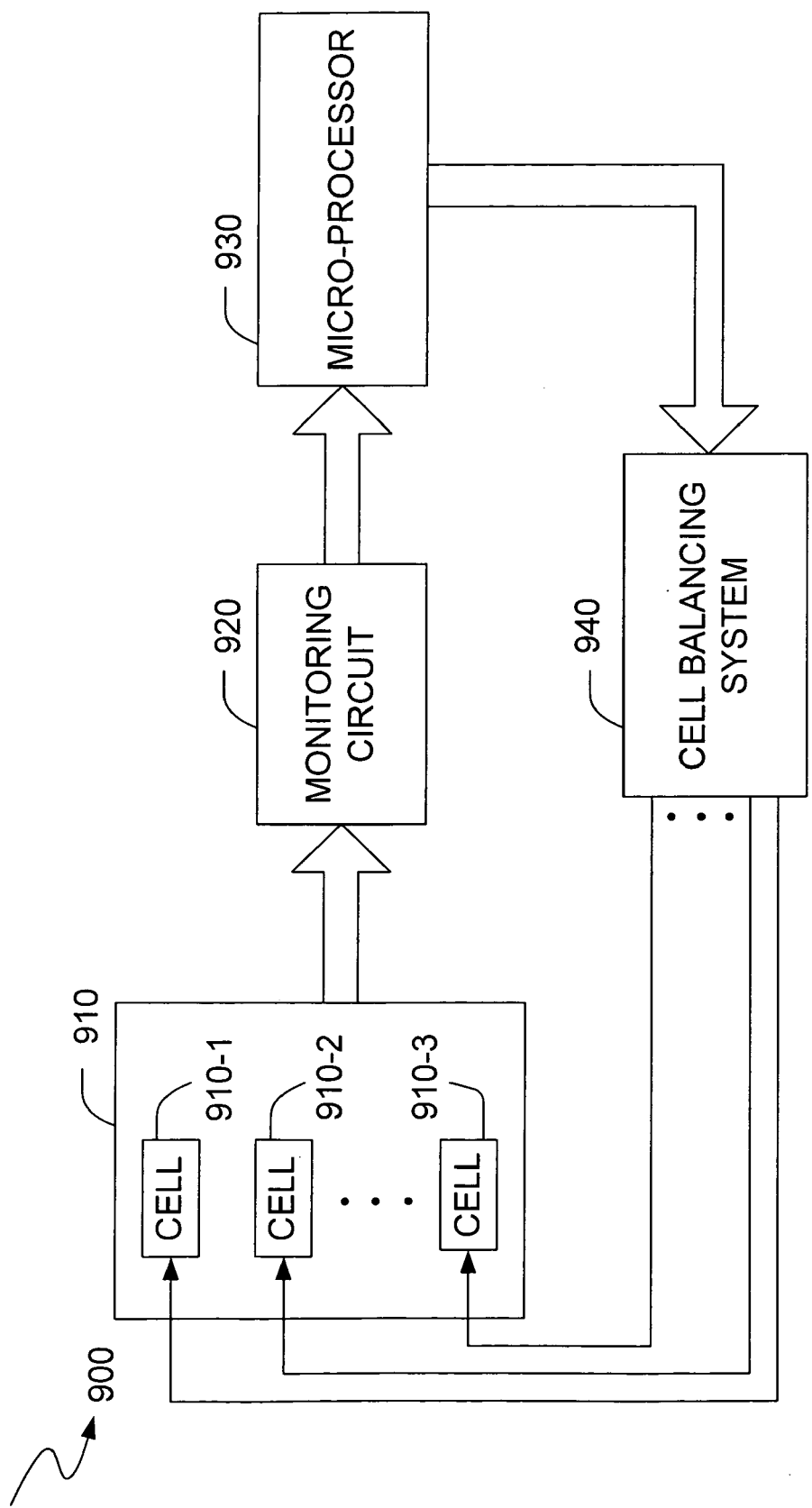
FIG. 9 is a block diagram of an exemplary monitoring and balancing system utilizing the cell balancing system, in accordance with the present invention.

Advantageously, in accordance with one embodiment of the present invention, the enable signal sent to the input terminal 150 in circuit 490C is a low-voltage signal received from a digital control circuit or a micro-processor in a mixed signal circuit, such as the circuit described in FIG. 9. In FIG. 9, the micro-processor determines whether any battery cell from 110, 112 and 114 needs to conduct the bypass current. Similarly, the input terminal 152 in circuit 490B and the input terminal 154 in circuit 490A also receive low-voltage signals from the digital control circuit or the micro-processor.

The circuit 490C further comprises a transistor 124 and a current source 160 coupled in series. The gate of the transistor 124 is coupled to the input terminal 150. If the input terminal 150 receives a high enable signal from a digital control circuit or a micro-processor indicating that the battery cell 110 needs to conduct the bypass current, the transistor 124 will be turned on. The current source 160 generates a bias current at terminal 318 of the cell balancing unit 130 in order to conduct the bypass current for the battery cell 110.

Similarly, the selection signal sent to the input terminal 170 is also a low-voltage signal from the digital control circuit or the micro-processor, such as the circuit described in FIG. 9. The micro-processor in FIG. 9 also determines whether to select external bypass paths 122 or internal bypass paths 132. The selection signal at terminal 170 controls all the cell balancing circuits 130 in FIG. 4. As a result, all cell balancing units 130 only receive low-voltage signals from the digital control circuit or the micro-processor. As such, no low-to-high voltage level shifter is necessary for the present invention.

The system 400 further comprises a transistor 126 with its gate coupled to the input terminal 170 and a current source 164. As described above, the signal at input terminal 170 controls all the cell balancing units 130 in FIG. 4. If the input terminal 170 receives a high selection signal from the digital control circuit or the micro-processor indicative of the selection of external bypass paths 122 for all battery cells 110, 112 and 114, the transistor 126 will be turned on. As such, the current source 164 provides a bias current to all cell balancing units 130 via terminals 312. Referring to circuit 490C, the cell balancing unit 130 generates a configuration signal at output terminal 320 to select the external bypass path 122. Similarly, cell balancing units 130 in circuits 490A and 490B also generate configuration signals at output terminals 320 to select external bypass paths 122.

Conversely, if the input terminal 170 receives a low selection signal from the digital control circuit or the micro-processor, the switch 126 will be switched off. As a result, no signal will be received at terminals 312. All cell balancing units 130 will select internal bypass paths 132, since no bias current is received from the current source 164. The detailed description will be made in relation to FIG. 5.

The system 400 further comprises a serial control bus 140 that connects all cell balancing units 130 from circuits 490A, 490B and 490C. When the input terminal 170 receives a high selection signal, the bias current provided by the current source 164 will flow through the serial control bus 140 to all cell balancing units 130, and external bypass paths 122 are selected. More specifically, the serial control bus 140 connects between nodes 312 and 310. The bias current flows from the positive terminal 310 of the cell 110 to the current source 164 along the serial control bus 140.

In the operation, each of input terminals 150, 152, or 154 receives an enable signal representing whether the corresponding battery cell 110, 112 and 114 needs to conduct the bypass current. Since circuits 490A, 490B and 490C for cell 110, 112 and 114 are similar, detailed description will only be made to the circuit 490C for cell 110 for clarity.

The bypass current will be conducted when cell 110 meets a certain unbalanced condition, such as the voltage of cell 110 is above a certain threshold (e.g., 3.9V), or the voltage difference between cell 110 and any other cell (e.g., cell 112 or cell 114) is greater than another threshold (e.g., 0.05V).

In the operation, the input terminal 150 receives an enable signal representing whether the corresponding battery cell 110 needs to conduct the bypass current. If the terminal 150 receives a high enable signal, it indicates that the corresponding cell 110 is under an unbalanced condition and the corresponding cell 110 needs to conduct the bypass current. If the terminal 150 receives a low enable signal, it indicates that the corresponding cell 110 is in normal operation and no bypass current is necessary.

If a high enable signal is received at terminal 150, the switch 124 will be turned on. Therefore, it allows a bias current (e.g., 1 μA) provided by the current source 160 to flow from the corresponding low-voltage cell balancing circuit 130 to the current source 160.

The selection signal at terminal 170 represents the global selection of external bypass paths 122 or internal bypass paths 132 for all cells 110, 112 and 114. If the selection signal at terminal 170 is high, all the external bypass paths 122 for all cells 110, 112 and 114 are selected. Therefore, the switch 126 will be switched on. The bias current (e.g., 1 μA) provided by the current source 164 will flow through the serial control bus 140 from the positive terminal 310 of battery cell 114 to the current source 164 along all cell balancing units 130. As a result, the corresponding terminal 312 for each cell will receive a bias current, thus allowing all cells 110, 112 and 114 to select external bypass paths 122.

Conversely, if the selection signal at terminal 170 is low, all the internal bypass paths 132 for all cells 110, 112 and 114 are selected. Therefore, no bias current will flow through the serial control bus 140. Internal bypass paths will be selected if no bias current is present in the serial control bus 140.

In general, the low-voltage cell balancing circuit 130 in circuit 490C will generate a configuration signal to conduct the external bypass path 122 or internal bypass path 132 based on the bias current at terminals 312 and 318, which will be described in detail below in relation to FIG. 5. Since circuits 490A and 490B operate similarly to circuit 490C, repetitive description will not be made for purposes of brevity and clarity.

Figure 5:
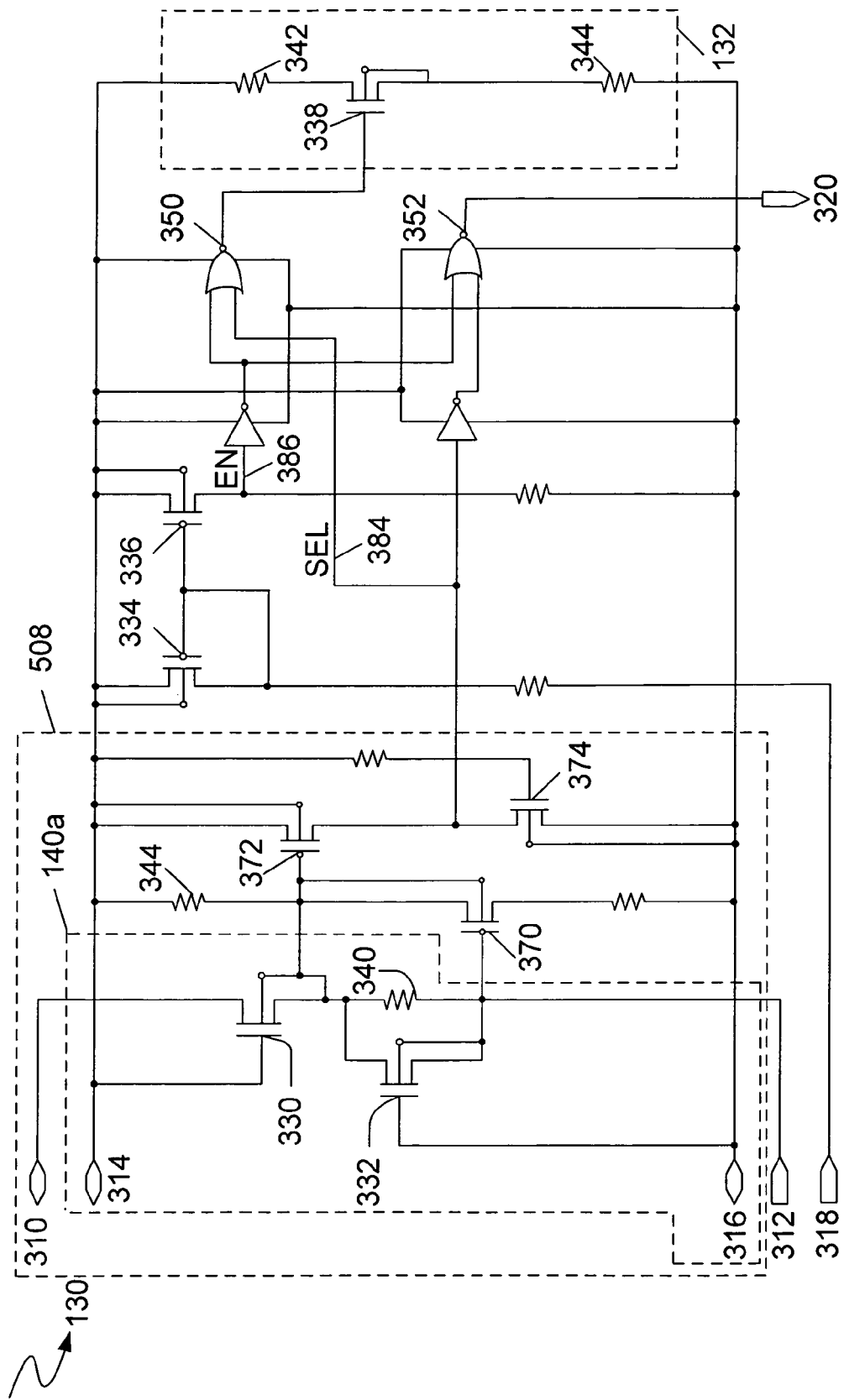
FIG. 5 is a detailed circuit configuration of the low-voltage cell balancing unit in FIG. 4, in accordance with one embodiment of the present invention.

Referring to FIG. 5, a detailed circuit diagram for the low-voltage cell balancing unit 130 in FIG. 4 is shown, in accordance with one embodiment of the present invention. Elements that are labeled the same as in FIG. 4 have similar functions and will not be repetitively described herein for purposes of brevity and clarity.

As shown in FIG. 5, the cell balancing unit 130 comprises a selection circuit 508 and an internal bypass path 132. The selection circuit 508 comprises the serial control bus 140a. The internal bypass path 132 comprises a transistor 338, a resistor 342, and a resistor 344 coupled in series. The serial control bus 140a comprises a transistor 330 in series with a resistor 340, and a transistor 332 in parallel with the resistor 340 for over-voltage protection.

Transistors 334 and 336 establish a current mirror. It will be appreciated that transistors 334 and 336 are matched in all aspects in one embodiment.

The low-voltage cell balancing unit 130 further comprises a NOR gate 350 coupled to the transistor 338 for controlling the conductance of the internal bypass path 132, and a NOR gate 352 coupled to the terminal 320 for controlling the conductance of the external bypass path 122 in FIG. 4.

During the operation, if the terminal 150 shown in FIG. 4 receives a high enable signal, this indicates the corresponding cell is unbalanced and the bypass current is necessary for the corresponding cell. As such, a bias current will be provided to the cell balancing unit 130 at terminal 318. Referring to FIG. 5, the bias current flows through the transistor 334 of the current mirror, and the output of the current mirror generates a high enable signal EN on the input signal line 386. The output of the NOR gate 350 determines the conductance of the internal bypass path 132, and the output of the NOR gate 352 determines the conductance of the external bypass path 122 shown in FIG. 4, which will be described in the next paragraph.

Furthermore, as described in FIG. 4, if the input terminal 170 receives a high selection signal, this indicates the selection of external bypass paths for all cells 110, 112, and 114. As such, a bias current will be provided to each cell balancing unit 130 via terminal 312. Referring to FIG. 5, this bias current through terminal 312 will turn on the transistor 370. Therefore, the voltage across the resistor 344 will be increased, which in turn triggers the transistor 372 to be turned on. As a result, a selection signal SEL on the signal line 384 is also high. As described above, the enable signal EN on the signal line 386 is high. Therefore, the output of the NOR gate 350 will be low. As such, the internal bypass path 132 will not be conducted since the transistor 330 with its gate coupled to the output of the NOR gate 350 in the internal bypass path 132 is OFF. Since both signals EN and SEL are high, the output of the NOR gate 352 is high, which will switch on the switch 120 in FIG. 4. Thus, the external bypass path 122 in FIG. 4 is conducted.

In addition, the bias current at terminal 312 will flow through the resistor 340 and transistor 330 of the serial control bus 140a to all the other low-voltage cell balancing units 130. In this way, all the low-voltage cell balancing units 130 will receive the same amount of the bias current. As such, all external bypass paths will be selected for all cells 110, 112 and 114. The transistor 332 will be conducted to bypass the current in the resistor 340 for over-voltage protection, which will be described in detail in relation to FIG. 6.

In another embodiment of the present invention, if the terminal 150 in FIG. 4 receives a high enable signal and the terminal 170 in FIG. 4 receives a low selection signal, the enable signal EN on the signal line 386 will be high and the selection signal SEL on the signal line 384 will be low. As a result, the output of the NOR gate 350 is high and the output of the NOR gate 352 is low. Therefore, the internal bypass path 132 will be conducted.

Figure 6:
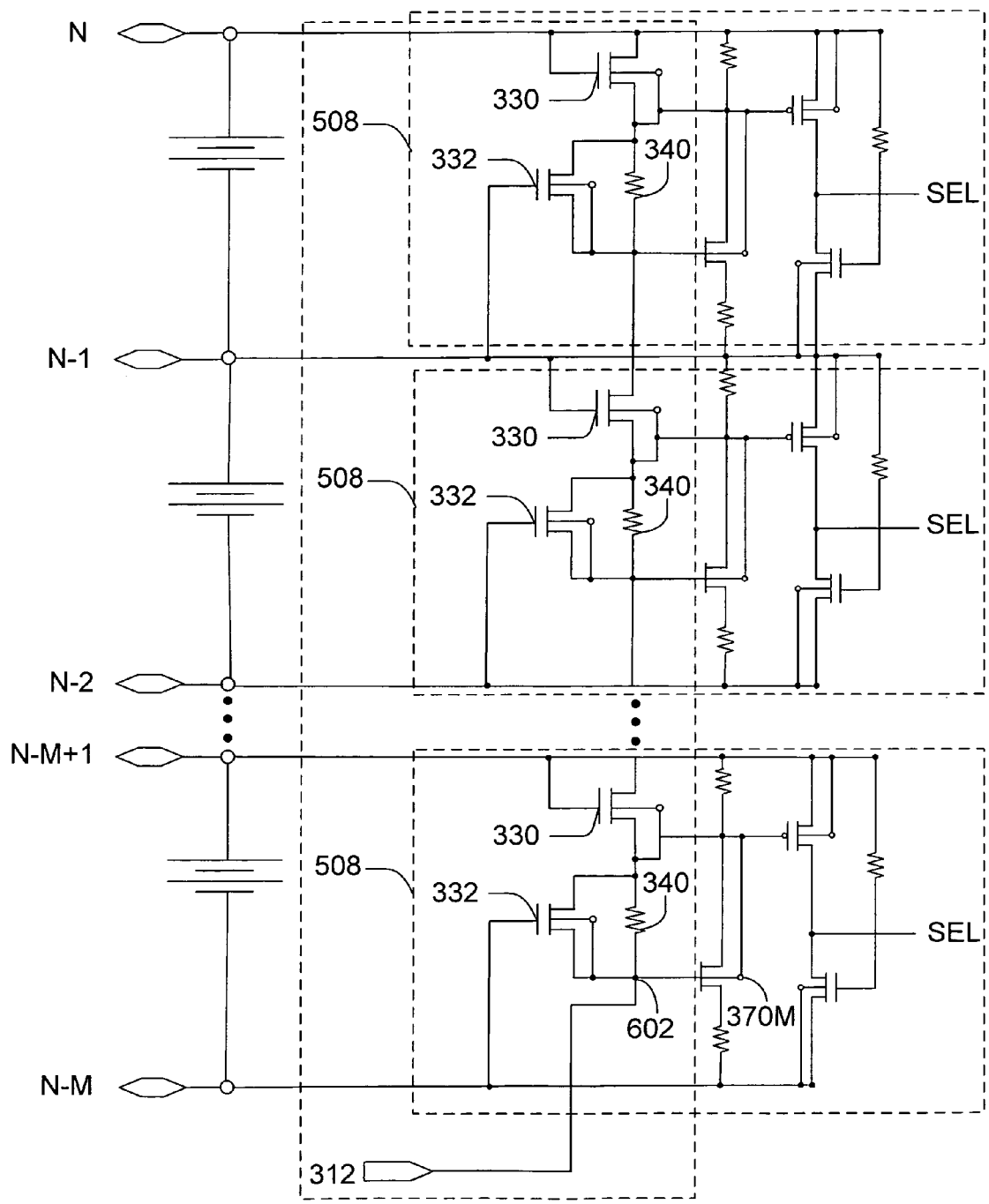
FIG. 6 is a circuit diagram of M-stage selection circuits with over-voltage protection, in accordance with one embodiment of the present invention.

FIG. 6 is a circuit diagram of M-stage selection circuits 508 with over-voltage protection, in accordance with one embodiment in the present invention. Elements labeled the same in FIG. 6, FIG. 4 and FIG. 5 have similar functions and will not be repetitively described herein for purposes of brevity and clarity. There are M stages (M cells) in FIG. 6.

As described in FIG. 4, if the input terminal 170 receives a high selection signal, this indicates the selection of external bypass paths. As such, a bias current will be provided to each cell balancing unit 130 at terminal 312. The bias current flows through the serial control bus 140 as shown in FIG. 6. More specifically, the bias current flows through transistors 330 and resistors 340.

If there are M cells coupled in series as shown in FIG. 6, the voltage difference between node N and node 602 is equal to the voltage over M resistors 340 in series. For purposes of descriptive clarity, the gate-source voltages of transistors 330, which are much smaller, are ignored herein, in one embodiment. Therefore, the difference between the voltage $V_N$ at node N and the voltage $V_{602}$ at node 602 is $V_N - V_{602} = I_{bias} \times [M \times R_{340}]$, where $I_{bias}$ is the bias current level and $R_{340}$ is the resistance of the resistor 340.

Embodiments of the present invention are capable of accommodating different numbers of battery cells based on the system power requirement. If fewer cells are needed, then a number of cells can be shorted. For example, if these M cells are shorted as needed, the voltage $V_N$ at node N is the same as the voltage $V_{(N-M)}$ at node N−M. Therefore, the voltage difference between node N and node 602 is equal to the voltage difference between node N–M and node 602 ($V_N$–$V_{602}$= $V_{(N-M)}$–$V_{602}$=$I_{bias}$×[M×$R_{340}$]). As shown in FIG. 6, the voltage difference between node N–M and node 602 is the gate-source voltage of the transistor 370M. As a result, the gate-source voltage of the transistor 370M is equal to the voltage over M resistors 340 in series.

The gate-source voltage of the transistor 370M increases as the number of cells M increases. This results in the breakdown of the transistor 370M, if the gate-source voltage is larger than the breakdown voltage of the transistor 370M. To prevent the over-voltage condition of the transistor 370M, a transistor 332 is employed to bypass the resistor 340, in one embodiment. In particular, when several cells are shorted, the transistor 332 will be conducted. Resistor 340 will be bypassed since the internal resistance $R_{332}$ of the transistor 332 is much smaller than the resistance $R_{340}$ of the resistor 340. The bias current flows through transistors 330 and transistors 332. Therefore, the gate-source voltage of transistor 370M is equal to $I_{bias}$×[M×$R_{332}$]. Since $R_{332}$<<$R_{340}$, the gate-source voltage of the transistor 370M is much smaller. As a result, the over-voltage condition is avoided by bypassing the resistor 340.

Figure 7:
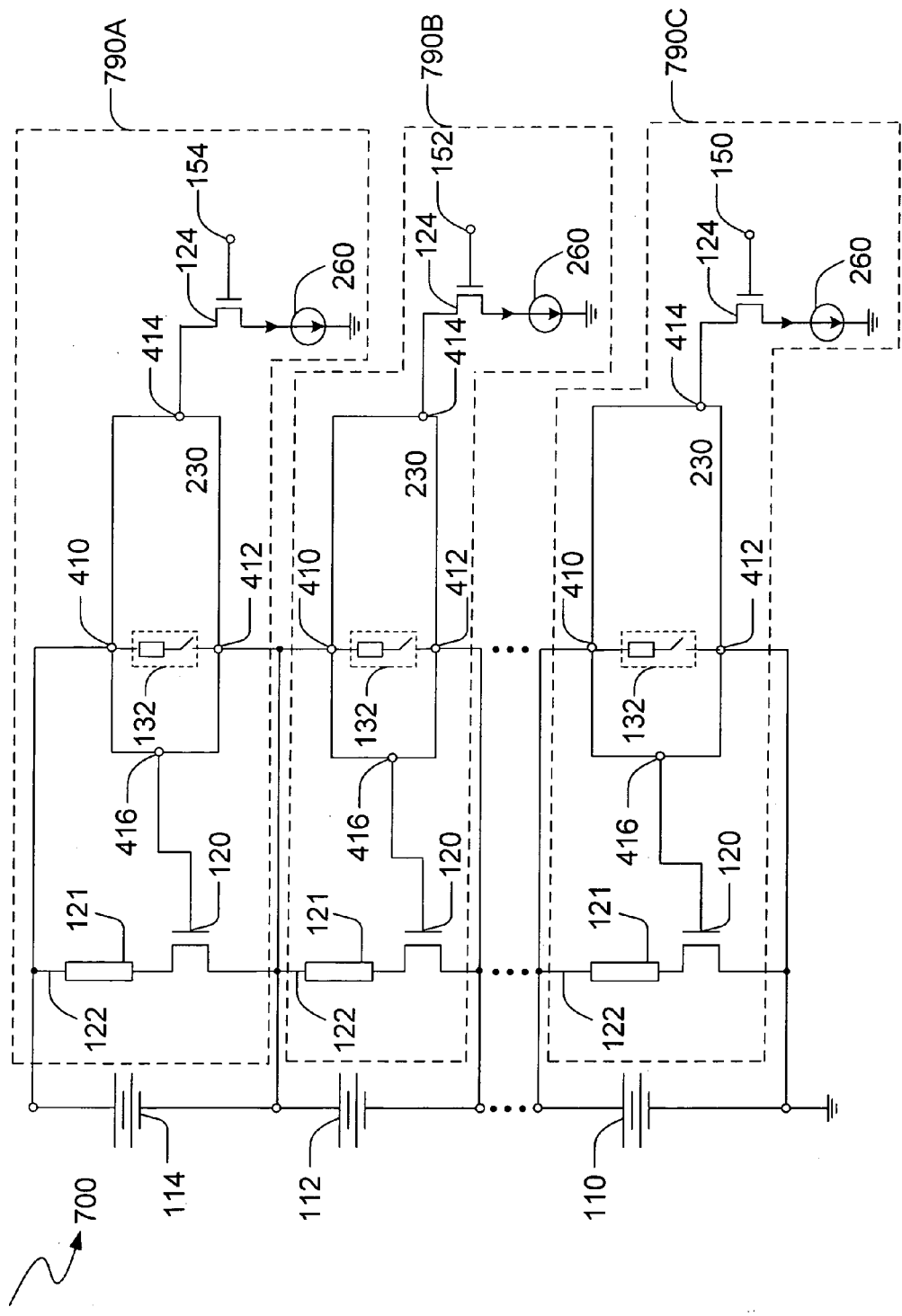
FIG. 7 is a block diagram of another system for balancing Lithium-ion battery cells by low-voltage cell balancing units, in accordance with one embodiment of the present invention.

FIG. 7 illustrates another system 700 for balancing Lithium-Ion battery cells 110,112 and 114 by low-voltage cell balancing units 230, in accordance with one embodiment of the present invention. The system 700 comprises circuits 790A, 790B and 790C for balancing cells 110, 112 and 114, respectively. Those skilled in the art will recognize that any number of cells may be included in system 700, in embodiments of the present invention.

In general, when a battery cell 110, 112 or 114 meets certain unbalanced conditions (e.g., the voltage across the battery cell exceeds a predetermined threshold), the corresponding circuit 790A, 790B or 790C will control the corresponding battery cell 110, 112 or 114 to perform cell balancing by conducting the bypass current. Since circuits 790A, 790B and 790C for cells 110, 112 and 114 are similar, detailed description will only be made to the circuit 790C for cell 110 for purposes of brevity and clarity.

The circuit 790C comprises an external bypass path 122, an internal bypass path 132, a driving circuit shown as the cell balancing unit 230, and input terminal 150.

The external bypass path 122 in circuit 790C includes a resistor 121 and a transistor 120 in series. In addition, the external bypass path 122 is coupled between the positive terminal 410 and negative terminal 412 of the battery cell 110.

The internal bypass path 132 in circuit 790C is also coupled between the positive terminal 410 and negative terminal 412 of the battery cell 110. The internal bypass path 132 is inside the driving circuit which is the cell balancing unit 230.

In accordance with one embodiment of the present invention, the input terminal 150 in circuit 790C receives an enable signal representing whether to enable the bypass current for the battery cell 110.

In accordance with another embodiment of the present invention, the variable current source 260 in circuit 790C generates a bias current, which selects among a combination of the internal bypass path 132 and external bypass path 122 for cell 110.

In circuit 790C, the cell balancing unit 230 is employed to receive the signal from the input terminal 150 and the bias current generated by the current source 260, and controls the conductance among the combination of the external bypass path 122 and the internal bypass path 132.

Advantageously, in accordance with one embodiment of the present invention, the enable signal sent to the input terminal 150 in circuit 790C is a low-voltage signal received from a digital control circuit or a micro-processor in a mixed signal circuit, such as the circuit described in FIG. 9. In FIG. 9, the micro-processor determines whether any battery cell from 110, 112 and 114 needs to conduct the bypass current, as will be described more fully below. Similarly, the input terminal 152 in circuit 790B and the input terminal 154 in circuit 790C also receive low-voltage signals from the digital control circuit or the micro-processor.

The circuit 790C further comprises a transistor 124 and a current source 260 coupled in series. The gate of the transistor 124 is coupled to the input terminal 150. If the input terminal 150 receives a high enable signal from a digital control circuit or a micro-processor indicating that the battery cell 110 needs to conduct the bypass current, the transistor 124 will be turned on. The current source 260 provides a bias current at terminal 414 of the cell balancing unit 230 to conduct the bypass current for the battery cell 110.

As described above, the variable current source 260 generates a variable bias current, which selects among a combination of the internal bypass path 132 and external bypass path 122 for the cell 110. Such selection of the combination includes the external bypass path 122, or the internal bypass path 132, or both external bypass path 122 and internal bypass path 132, in accordance with one embodiment of the present invention. In other words, the current source 260 in the present embodiment selects the external bypass path 122, or the internal bypass path 132, or both external bypass path 122 and internal bypass path 132 based on the current level of the current source 260.

In one exemplary embodiment, the external bypass path 122 will be selected if the current level of the current source 260 reaches a certain value (e.g., 2 µA). In another exemplary embodiment, both external bypass path 122 and internal bypass path 132 will be selected if the current level of the current source 260 reaches another value (e.g., 6 µA). In another exemplary embodiment, the internal bypass path 132 will be selected if the current level of the current source 260 reaches at a certain value (e.g., 2 µA).

In the operation, each of the input terminals 150, 152, or 154 receives an enable signal representing whether the corresponding battery cell 110, 112 and 114 needs to conduct the bypass current. Since circuits 790A, 790B and 790C for cells 110, 112 and 114 are similar, detailed description will only be made to the circuit 790C for cell 110 for clarity.

In the operation, the bypass current for cell 110 will be conducted when cell 110 meets a certain unbalanced condition, such as the voltage of cell 110 is above a certain threshold (e.g., 3.9V), or the voltage difference between the cell 110 and any other cell (e.g., cell 112 or cell 114) is greater than another threshold (e.g., 0.05V).

In circuit 790C, the input terminal 150 receives an enable signal representing whether the corresponding battery cell 110 needs to conduct the bypass current. If the terminal 150 receives a high enable signal, it indicates that the corresponding cell 110 is under an unbalanced condition and the corresponding cell 110 needs to conduct the bypass current. If the terminal 150 receives a low enable signal, it indicates that the corresponding cell 110 is in normal operation and no bypass current will be conducted.

For instance, if the enable signal at terminal 150 is high, this indicates that the cell balancing is necessary for the battery cell 110. As such, the corresponding switch 124 will be turned on. Therefore, the terminal 414 of the low-voltage cell balancing unit 230 will receive a bias current generated by the variable current source 260 (e.g., 2 µA~6 µA). More specifically, the bias current flows from the low-voltage cell balancing circuit 230 to the current source 260.

Based on the enable signal from terminal 150 and the bias current level from the current source 260, the low-voltage cell balancing unit 230 for cell 110 will selectively conduct among the combination of the internal bypass path 132 and external bypass path 122 for the cell 110. That is, either the internal bypass path 132 or external bypass path 122 may be selected, or both internal bypass path 132 and external bypass path 122 are selected, in accordance with embodiments of the present invention. For example, the external bypass path 122 is conducted by a configuration signal generated at terminal 416 of the low-voltage cell balancing unit 230. Furthermore, in FIG. 7, the system 700 eliminates the serial control bus shown in FIG. 4.

Figure 8:
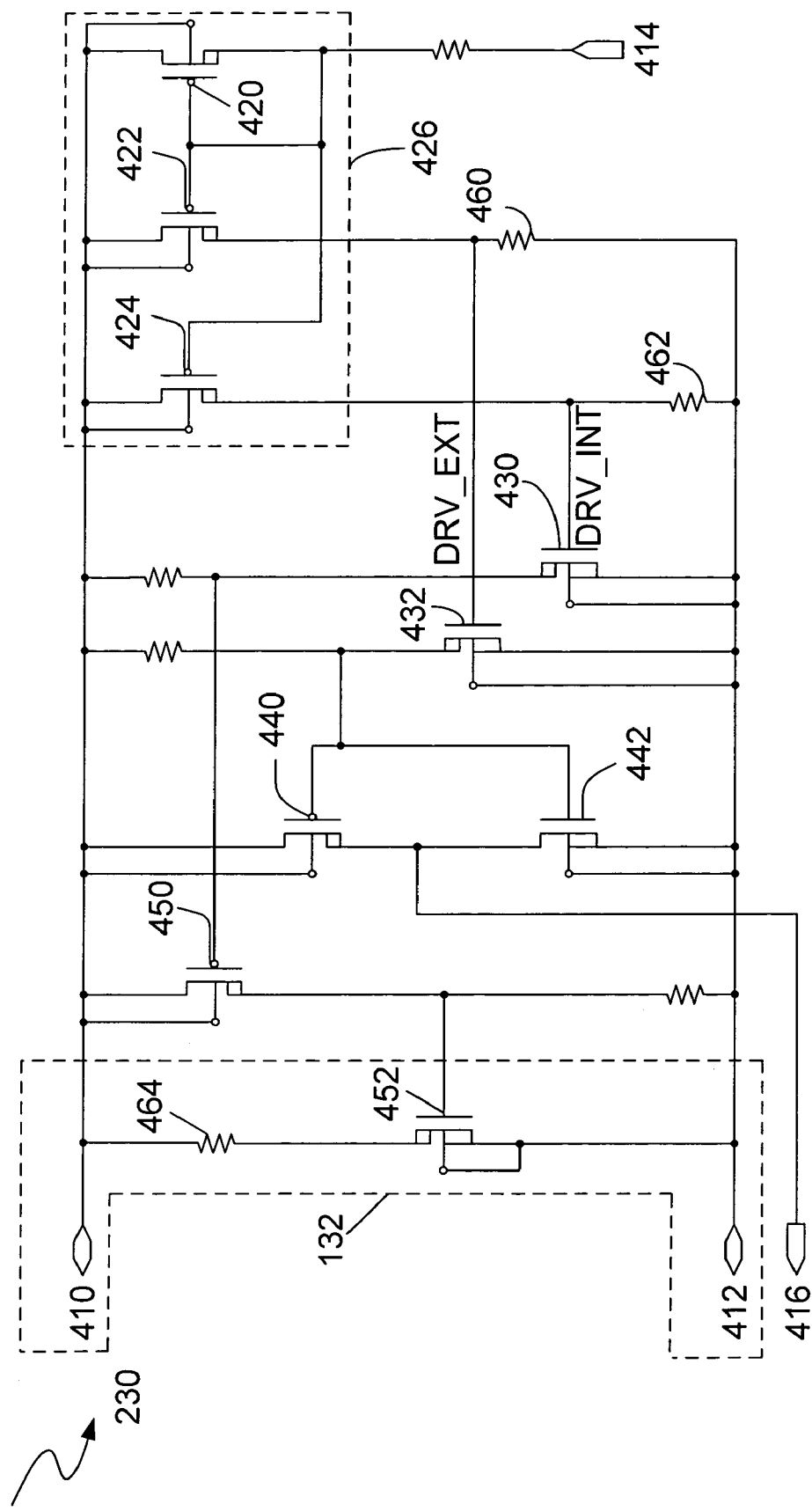
FIG. 8 is a detailed circuit configuration of the low-voltage cell balancing unit in FIG. 7, in accordance with one embodiment of the present invention.

FIG. 8 shows a detailed circuit diagram for the low-voltage cell balancing unit 230 in FIG. 7, in accordance with one embodiment of the present invention. Elements labeled the same in FIG. 8 and FIG. 7 have similar functions and will not be repetitively described herein for purposes of brevity and clarity.

The low-voltage cell balancing unit 230 comprises an internal bypass path 132, a current mirror 426, a transistor 432 coupled to a resistor 460, and a transistor 430 coupled to a resistor 462. The internal bypass path 132 includes a resistor 464 and a transistor 452 coupled in series.

The current mirror 426 includes transistors 420, 422, 424. One skilled in the art will appreciate that the transistors 420, 422, 424 in the current mirror 426 are matched in all aspects in one embodiment. Transistor 432 is employed to control the conductance of the external bypass path 122 in FIG. 7, and transistor 430 is employed to control the conductance of the internal bypass path 132.

In the operation, if the terminal 150 as described in FIG. 7. receives a high enable signal, this indicates that the corresponding cell is unbalanced and the bypass current is necessary for the corresponding cell. As such, a bias current will be provided to the cell balancing unit 230 at terminal 414. Referring to FIG. 7, this bias current will flow through the transistor 420 of the current mirror 426 via terminal 414. The current mirror 426 will generate two output signals DRV_EXT and DRV_INT. DRV_EXT represents the voltage across the resistor 460 and DRV_INT represents the voltage across the resistor 462.

For instance, in one exemplary embodiment, if transistors 432 and 430 are matched in all aspects and the resistance $R_{460}$ of the resistor 460 is larger than the resistance $R_{462}$ of the resistor 462 (e.g., the ratio of $R_{460}/R_{462}$ is 3), then resistors 460 and 462 could be configured such that DRV_EXT is greater than the transistor threshold voltage and DRV_INT is less than the transistor threshold voltage in one embodiment. In such case, the transistor 432 will be conducted and transistor 430 remains OFF. As a result, transistors 440 and 442 will be switched on. Therefore, terminal 416 will generate a high-voltage signal able to switch on the transistor 120 as shown in FIG. 7, and the external bypass path 122 in FIG. 7 is thus conducted.

By increasing the bias current (e.g., to 6 μA), both transistors 430 and 432 could be conducted. Since transistor 432 is switched on, transistor 450 will be switched on. Therefore, transistor 452 in the internal bypass path 132 is switched on. In such case, not only the external bypass path 122 is conducted, but also the internal bypass path 132 is conducted.

As discussed in FIG. 8, the external bypass path 122 is conducted when the bias current at terminal 414 reaches a certain threshold (e.g., 2 μA), and both external bypass path 122 and internal bypass path 132 are conducted when the bias current at terminal 414 reaches another threshold (e.g., 6 μA).

In order to conduct the internal bypass path 132 only, in one embodiment, the external bypass path 122 is disconnected temporarily since the external bypass path 122 is externally located. When the bias current at terminal 414 reaches a threshold (e.g., 6 μA), which is able to conduct both internal and external bypass paths, the user can manually disconnect the external bypass path 122. Therefore, only the internal bypass path 132 will be conducted.

In another embodiment, the configuration of resistors 460 and 462 in FIG. 8 are changed such that DRV_INT is greater than the transistor threshold voltage and DRV_EXT is less than the transistor threshold voltage. As such, only the internal bypass path 132 will be conducted when the bias current at terminal 414 reaches a certain threshold (e.g., 2 μA).

FIG. 9 shows a block diagram of an exemplary monitoring and balancing system 900 utilizing the cell balancing system 940 in accordance with the present invention. System 900 generally comprises a battery pack 910 having cells 910-1, 910-2 and 910-3, a monitoring circuit 920, a micro-processor 930, and a cell balancing system 940. The monitoring circuit 920 monitors the cell voltage over each cell 910-1, 910-2 and 910-3. The micro-processor 930 receives monitoring information provided by the monitoring circuit 920, and determines two conditions.

The cell balancing system 940 is analogous to the cell balancing system 400 as described in FIG. 4, in accordance with one embodiment. The cell balancing system 400 has been detailed described, hence will not be repetitively described herein for purposes of brevity and clarity. By utilizing the cell balancing system 400, cells 910-1, 910-2 and 910-3 in the present embodiment select either external bypass paths or internal bypass paths to conduct bypass current in consistent with the detailed description in FIG. 4 and FIG. 5.

Furthermore, the cell balancing system 940 is analogous to the cell balancing system 700 as described in FIG. 7, in accordance with one embodiment. The cell balancing system 700 has been detailed described, hence will not be repetitively described herein for purposes of brevity and clarity. By utilizing the cell balancing system 700, cells 910-1, 910-2 and 910-3 in the present embodiment select external bypass paths, or internal bypass paths, or both external and internal bypass paths to conduct bypass current in consistent with the detailed description in FIG. 7 and FIG. 8.

The first condition defined by the micro-processor 930 is that the cell voltage over any cell 910-1, 910-2 and 910-3 is greater than a voltage threshold. For instance, for a typical Li-Ion battery, the voltage threshold is 3.90 V. The second condition defined by the micro-processor 930 is that the voltage difference between any two cells 910-1, 910-2 and 910-3 in the battery pack 910 is greater than a maximum voltage difference (e.g., 0.05V).

In one embodiment, the micro-processor 930 in the present embodiment is configured to send a high enable signal to the cell balancing system 940 indicating that the corresponding cell needs to conduct bypass current, if and only if the first condition is met. For example, if the cell voltages over cells 910-1, 910-2 and 910-3 are 3.94 V, 3.87 V and 3.91 V respectively, the micro-processor 930 will send a high enable signal to the cell balancing system 940 indicating that cell 910-1 and cell 910-3 need to conduct the bypass current.

Advantageously, the micro-processor 930 in the present embodiment is also configured to send a high enable signal to the cell balancing system 940 indicating that the corresponding cell needs to conduct bypass current only when both first and second conditions are met. For example, if the cell voltages over cells 910-1, 910-2 and 910-3 are 3.94 V, 3.87 V and 3.91 V respectively, the micro-processor 930 will send a high enable signal to the cell balancing system 940 indicating that cell 910-1 needs to conduct the bypass current. The cell 910-3 will receive a low enable signal from the micro-processor 930 indicating that the cell 910-3 does not need to conduct the bypass current, since neither the voltage difference between cell 910-3 and 910-1, nor the voltage difference between cell 910-3 and 910-2 exceeds the maximum voltage difference (e.g., 0.05 V).

The micro-processor 930 will also send a selection signal for cells 910-1, 910-2, and 910-3 to the cell balancing system 940. The selection signal determines whether to select internal bypass paths or external bypass paths.

Accordingly, the present invention provides a low cost cell balancing system that is able to support external and internal cell balancing. The cell balancing system in the present invention supports balancing of multiple cells simultaneously with flexible algorithms controlled by a micro-processor or a digital control module.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A cell balancing circuit comprising:
   a first cell;
   a first bypass path for said first cell;
   a second bypass path for said first cell;
   a first input for receiving a first signal for conducting a bypass current of said first cell;
   a second input for receiving a second signal for selecting either said first bypass path or said second bypass path for said first cell; and
   a first driving circuit for receiving said first signal and said second signal, and for providing a third signal configured to selectively conduct either said first bypass path or said second bypass path for said first cell.

2. The cell balancing circuit as claimed in claim 1, further comprising:
   a second cell coupled in series with said first cell;
   a third bypass path for said second cell;
   a fourth bypass path for said second cell;
   a third input for receiving a fourth signal for conducting bypass current of said second cell;
   a fourth input for receiving a fifth signal for selecting either said third bypass path or said fourth bypass path for said second cell; and
   a second driving circuit for receiving said fourth signal and said fifth signal, and for providing a sixth signal configured to selectively conduct either said third bypass path or said fourth bypass path for said second cell.

3. The cell balancing circuit as claimed in claim 1, wherein said first signal comprises a low voltage signal received from a processor, wherein said processor determines whether said first cell needs to conduct said bypass current.

4. The cell balancing circuit as claimed in claim 1, further comprising:
   a first switch selectively switched on by said first signal; and
   a first current source coupled to said first switch for selectively providing a first bias current to said first driving circuit,
   wherein said first bias current is configured to conduct said bypass current for said first cell.

5. The cell balancing circuit as claimed in claim 1, wherein said second signal comprises a low voltage signal received from said processor, and wherein said processor determines whether to select said first bypass path or said second bypass path.

6. The cell balancing circuit as claimed in claim 4, further comprising:
   a second switch selectively switched on by said second signal; and
   a second current source coupled to said second switch for selectively providing a second bias current to said first driving circuit,
   wherein said second bias current is configured to select either said first bypass path or said second bypass path for said first cell.

7. The cell balancing circuit as claimed in claim 2, further comprising:
   a serial control bus coupled from said first driving circuit to said fourth input and for transmitting said fifth signal to said fourth input.

8. The cell balancing circuit as claimed in claim 7, wherein said serial control bus comprises a fifth bypass path configured to perform over-voltage protection.

9. A cell balancing circuit comprising:
   a plurality of cells of a battery pack;
   an internal bypass path for each cell of said plurality of cells;
   an external bypass path for each cell of said plurality of cells;
   an input for receiving an enable signal for each cell of said plurality of cells, wherein said enable signal is configured to enable a bypass current of each cell of said plurality of cells;
   a current source for each cell of said plurality of cells configured to provide a variable bias current, wherein said bias current selects among a combination of said internal bypass path and said external bypass path for each cell of said plurality of cells; and
   a driving circuit for receiving said enable signal and said bias current for each cell of said plurality of cells, and for providing a configuration signal for each cell of said plurality of cells configured to selectively conduct among said combination for each cell of said plurality of cells.

10. The cell balancing circuit as claimed in claim 9, wherein said enable signal comprises a low voltage signal received from a processor, wherein said processor determines whether each cell of said plurality of cells needs to conduct said bypass current.

11. The cell balancing circuit as claimed in claim 9, further comprising:
    a switch selectively switched on by said enable signal, wherein said switch coupled to said current source for selectively providing said bias current to said driving circuit.

12. The cell balancing circuit as claimed in claim 9, wherein said combination is selected from the group consisting of said internal bypass path, said external bypass path, and paths including both internal bypass path and said external bypass path.

13. The cell balancing circuit as claimed in claim 10, wherein said internal bypass path from said combination is selected when said bias current reaches a first predetermined level.

14. The cell balancing circuit as claimed in claim 13, wherein said external bypass path from said combination is selected when said bias current reaches a second predetermined level.

15. The cell balancing circuit as claimed in claim 14, wherein both said internal bypass path and said external bypass path from said combination are selected when said bias current reaches a third predetermined level.

16. A method for balancing a battery pack comprising:
    receiving an enable signal for each cell of a plurality of cells for enabling a bypass current of each cell of said plurality of cells;
    receiving a selection signal for each cell of said plurality of cells for selecting among a combination of an internal bypass path and an external bypass path for each cell of said plurality of cells;
    generating a configuration signal for each cell of said plurality of cells for selectively conducting among said combination for each cell of said plurality of cells; and
    conducting among said combination for each cell of said plurality of cells.

17. The method as claimed in claim 16, further comprising:
    transmitting said selection signal over a serial control bus to each cell of said plurality of cells for selecting among said combination.

18. The method as claimed in claim 17, wherein said combination is selected from the group consisting of said internal bypass path, and said external bypass path.

19. The method as claimed in claim 16, further comprising:
    generating a variable bias current to provide said selection signal for each cell of said plurality of cells for selecting among said combination.

20. The method as claimed in claim 19, wherein said combination is selected from the group consisting of said internal bypass path, said external bypass path, and paths including both internal bypass path and said external bypass path.

21. The method as claimed in claim 20, further comprising:
    selecting said internal bypass path when said bias current reaches a first predetermined level.

22. The method as claimed in claim 21, further comprising:
    selecting said external bypass path when said bias current reaches a second predetermined level.

23. The method as claimed in claim 22, further comprising:
    selecting both said internal bypass path and said external bypass path when said bias current reaches a third predetermined level.

24. An electronic device comprising:
    a plurality of cells of a battery pack;
    a monitoring circuit for monitoring a voltage level of each cell of said plurality of cells and providing a monitoring signal for each cell of said plurality of cells representative of each said voltage level;
    a processor for receiving each said monitoring signal, and providing an enable signal and a selection signal for each cell of said plurality of cells, wherein said enable signal representative of said voltage level of each cell of said plurality of cells greater than a first predetermined threshold or a voltage difference between said voltage level and a minimum of said voltage level greater than a second predetermined threshold; and
    a cell balancing circuit for receiving each said enable signal and said selection signal, and balancing said plurality of cells, said cell balancing circuit comprising:
    an internal bypass path for each cell of said plurality of cells;
    an external bypass path for each cell of said plurality of cells;
    a first input for receiving said enable signal from said processor for conducting bypass current for each cell of said plurality of cells;
    a second input for receiving said selection signal from said processor for selecting among a combination of said internal bypass path and said external bypass path for each cell of said plurality of cells; and
    a driving circuit for receiving said enable signal and said selection signal and for providing a configuration signal configured to selectively conduct among said combination of for each cell of said plurality of cells.

25. The electronic device as claimed in claim 24, wherein said combination is selected from the group consisting of said internal bypass path, said external bypass path, and paths including both internal bypass path and said external bypass path.

26. The electronic device as claimed in claim 24, wherein said combination is selected from the group consisting of said internal bypass path and said external bypass path.

\* \* \* \* \*